(12) United States Patent
Chaudhary

(10) Patent No.: US 6,258,865 B1
(45) Date of Patent: Jul. 10, 2001

(54) POLYMER FOAM AND METHOD OF MAKING USING OIL-CONTAINING FURNACE BLACK AS AN INSULATION ENHANCER

(75) Inventor: Bharat I. Chaudhary, Pearland, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/595,069

(22) Filed: Jun. 15, 2000

Related U.S. Application Data

(60) Provisional application No. 60/139,602, filed on Jun. 17, 1999.

(51) Int. Cl.$^7$ ................................................. C08J 9/16
(52) U.S. Cl. ................................ 521/99; 521/131; 521/56
(58) Field of Search .......................... 521/55, 131, 56, 521/99

(56) References Cited

U.S. PATENT DOCUMENTS

| | | | |
|---|---|---|---|
| 3,573,152 | 3/1971 | Wiley et al. | 161/60 |
| 4,795,763 | * 1/1989 | Gluck et al. | 521/99 |
| 4,824,720 | 4/1989 | Malone | 428/294 |
| 5,109,029 | 4/1992 | Malone | 521/79 |
| 5,110,841 | 5/1992 | Malone | 521/94 |
| 5,124,097 | 6/1992 | Malone | 264/51 |
| 5,373,026 | 12/1994 | Bartz et al. | 521/82 |
| 5,397,807 | 3/1995 | Hitchcock et al. | 521/76 |
| 5,424,016 | 6/1995 | Kolosowski | 264/156 |
| 5,461,098 | 10/1995 | Hitchcock et al. | 524/297 |
| 5,482,978 | 1/1996 | Takahashi et al. | 521/82 |
| 5,571,847 | 11/1996 | Hitchcock et al. | 521/56 |
| 5,585,058 | 12/1996 | Kolosowski | 264/156 |
| 5,710,186 | * 1/1998 | Chaudhary | 521/60 |

FOREIGN PATENT DOCUMENTS

| | | | |
|---|---|---|---|
| 279668 | 3/1997 | (EP) | B29C/44/00 |
| 802655 | 2/1955 | (GB) . | |
| 53-1262 | 1/1978 | (JP) | B29C/47/12 |
| 60-015114 | 1/1985 | (JP) | B29C/47/00 |
| H6-263909 | 9/1994 | (JP) | B29C/47/00 |
| WO 94/13721 | 6/1994 | (WO) | C08G/18/00 |
| WO 95/15356 | 6/1995 | (WO) | C08J/9/00 |

OTHER PUBLICATIONS

Plastic Foams, Part II, Frisch and Saunders, pp. 544–585, Marcel Dekker, Inc. (1973).

Plastic Materials, Brydson 5$^{th}$ edition, pp. 426–429, Butterworths (1989).

* cited by examiner

*Primary Examiner*—Rachel Gorr
*Assistant Examiner*—Melanie Bagwell

(57) ABSTRACT

A closed-cell polymeric foam is provided which is formed using oil-containing furnace black as an insulation enhancer. Other foam properties (for example, cell sizes, densities, limiting oxygen index performance) are similar to those obtained with the use of thermal blacks.

10 Claims, No Drawings

POLYMER FOAM AND METHOD OF MAKING USING OIL-CONTAINING FURNACE BLACK AS AN INSULATION ENHANCER

This application claims the benefit of U.S. Provisional Application No. 60/139,602, filed Jun. 17, 1999.

BACKGROUND OF THE INVENTION

The present invention relates to closed-cell polymer foams, particularly to such foams that include an insulation-enhancing amount of an oil-containing furnace black, and more particularly, to a method of making such foams.

Carbon black, well known in the art as an effective infrared radiation absorber and reflector, has a conventional use as an additive in insulative foam structures to reduce thermal conductivity. However, the addition of carbon black often results in dispersion problems when manufacturing the foams. Such processing problems include increased pressure drop, higher foam density, increased open cells, and poor skin quality.

An attempt to solve some of these problems uses thermal grade carbon black (thermal black). For example, U.S. Pat. No. 5,373,026 discloses that thermal black processes easier, incorporates into a foam structure more readily, induces a lower process pressure drop, and has a lesser impact on polymer foam skin quality, all relative to other forms of carbon black.

Other attempts use carbon black coated with small amounts of a compatibilizing agent, such as a fatty acid, a phthalic ester, an oil, or a polyalkylene glycol, to enhance carbon black dispersion in both foam formulation and a resulting end-product foam. See U.S. Pat. No. 5,461,098; 5,397,807; and 5,571,847. However, compatibilizing agent addition involves an extra manufacturing step that increases foam production expense.

U.S. Pat. No. 5,710,186 uses titanium dioxide ($TiO_2$) particles surface treated with a small amount of a wetting agent to enhance insulation capability of foams. The surface treated $TiO_2$ grades cost more and provide less foam insulation performance improvement than carbon black.

Accordingly, a need remains for another cost-effective foam making method that provides enhanced insulation performance without adversely affecting foam processing or end product foam properties.

SUMMARY OF THE INVENTION

The present invention meets that need with a polymer foam that includes an oil-containing furnace black as an insulation enhancer. The use of oil-containing furnace black yields a foam with a lower thermal conductivity than comparable foams produced with thermal black and properties that compare favorably with those achieved with other conventional carbon blacks. The furnace black is also relatively low in cost.

One aspect of the present invention is a polymer foam prepared from a foamable polymeric material that contains a quantity of furnace black sufficient to reduce foam thermal conductivity to a level below that of a corresponding foam prepared from the same foamable polymeric material save for omission of the furnace black. The furnace black contains from 3 to 10 percent by weight oil (wt %), based on total furnace black weight. The oil preferably comprises a hydrotreated heavy naphthenic distillate. Preferably, the foam contains from 1 to 25 wt % more preferably from 2 to 10 wt %, based on total foam weight, furnace black.

The polymer foam may be made by an extrusion process that comprises the steps of: a) providing a foamable polymeric material; b) adding an amount of oil-containing furnace black to said foamable polymeric material sufficient to reduce the thermal conductivity of the foam below that of a foam without said furnace black, said furnace black having from 3–10 percent by weight oil, based on total furnace black weight, incorporated therein; c) adding a blowing agent to form a gel; d) cooling the foamable gel to an optimum foaming temperature; and e) extruding the gel through a die to form said foam. The use of an oil-containing furnace black in preparing foams of the present invention results in a foam with similar or better reduction in thermal conductivity than that achieved with the same loading of thermal black. In addition, the furnace black provides pressure drops and foam properties (cell sizes, densities, limiting oxygen index performance, heat distortion temperatures and/or open cell contents) similar to those obtained with thermal blacks. The furnace black is preferably added as a concentrate in the polymer.

The present invention also provides a method for making a thermoset polymer foam which comprises providing a first thermoset monomer; providing a second thermoset monomer the same or different than the first monomer and polymerizable with the first monomer; incorporating into either or both the first and second monomers an amount of furnace black sufficient to reduce the thermal conductivity of the foam below that of a foam without said furnace black, said furnace black having from 3–10 wt % oil, based on total furnace black weight, incorporated therein; incorporating a blowing agent into either or both the first and second monomers; and mixing the first and second monomers under polymerizing conditions to form the thermoset polymer foam.

An alternative embodiment of the invention provides a method for making expandable thermoplastic foam beads. The foam may be made by expanding such beads with or without an intermediate step of forming pre-expanded beads. This method comprises providing a first thermoplastic monomer; providing a second thermoplastic monomer the same or different than the first monomer and polymerizable with the first monomer; polymerizing the first and second monomers to form thermoplastic particles; incorporating, during polymerization, an amount of furnace black sufficient to reduce the thermal conductivity of the foam below that of a foam without said furnace black, said furnace black having from 3–10 percent by weight, based on total furnace black weight, of oil incorporated therein; incorporating a blowing agent into the thermoplastic particles during or after polymerization; and cooling the thermoplastic particles to form the expandable foam beads.

In another alternative embodiment, the invention is a process for making expandable thermoplastic foam beads, the process comprising: heating a thermoplastic polymer material to form a melt polymer material; incorporating into the melt polymer material an amount of furnace black sufficient to reduce the thermal conductivity of the foam below that of a foam without said furnace black, said furnace black having from 3–10 percent by weight, based on furnace black weight, of oil incorporated therein; further incorporating a blowing agent into the melt polymer material at an elevated temperature to form a foamable gel; cooling the foamable gel to form an essentially continuous expandable thermoplastic strand; and pelletizing the expandable thermoplastic strand to form expandable foam beads.

Accordingly, it is a feature of the present invention to provide a foam prepared using oil-containing furnace black.

It is a further feature of the invention to provide a method of making such a foam. These, and other features and advantages of the present invention will become apparent from the following detailed description and the appended claims.

DETAILED DESCRIPTION OF THE PREFERRED EMBODIMENTS

The use of oil-containing furnace black unexpectedly provides effective insulation enhancement without substantially adversely affecting foam quality. This differs from carbon blacks that contain compatibilizing additives, which can plasticize the polymeric material and negatively impact heat distortion performance of the foam. The use of oil-containing furnace blacks also results in low manufacturing process pressure drops similar to those obtained with thermal black.

Furnace blacks that contain from 90 to 97 wt % carbon black and 3 to 10 wt % oil, based on furnace black weight, provide enhanced insulation without adversely affecting foam properties or causing unacceptably high pressure drops. An example of an oil-containing furnace black is PANTHER 18 (EC-261) available from Engineered Carbons, Inc. This furnace black has heretofore typically been used in printing applications, but has now been found to be beneficial in foam processing. The furnace black is in the form of oil-containing pellets having a nominal particle size of 30 nm and containing 7 wt % hydrotreated heavy naphthenic distillate.

While not wishing to be bound to a particular theory, it is believed that this particular furnace black is not detrimental to foam processing or to the resulting foam properties because the oil is incorporated into the carbon black during the manufacturing process, i.e., the oil diffuses into and becomes entrapped within the matrix or bodies of individual carbon black particles and does not migrate into the polymer melt or the foam during processing. The PANTHER 18 furnace black is pelletized from oil whereas other furnace blacks are pelletized from water. This species of furnace black disperses easily in the polymer melt or polymer gel of the melt and the blowing agent prior to expansion into the foam. The furnace black is preferably present in amount of from 2 to 10 wt %, based on the weight of the polymer material in the foam.

Suitable polymeric materials include any polymer, either thermoplastic or thermoset, which can be blown into foam. Illustrative polymers include olefin polymers or polyolefins, vinylchloride polymers, alkenyl aromatic polymers, polycarbonates, polyetherimides, polyamides, polyesters, vinylidene chloride polymers, acrylate polymers, methacrylate polymers such as polymethylmethacrylate, urethane polymers, isocyanurate polymers, and phenolics. Such polymers may be homopolymers (e.g. polyvinyl chloride or PVC, polyurethane and polyisocyanurate), copolymers (e.g. vinylidene chloride/methyl acrylate copolymers and vinylidene chloride/vinyl chloride copolymers) and terpolymers. The polymers may be in the form of thermoplastic polymer blends, or a modified polymer or polymer such as a rubber-modified polymer. Suitable polyolefins include polyethylene (PE) and polypropylene (PP), and ethylene copolymers.

The polymeric material is preferably an alkenyl aromatic polymer material. Suitable alkenyl aromatic polymer materials include alkenyl aromatic homopolymers and copolymers (two polymerizable monomers), terpolymers (three polymerizable monomers) or interpolymers (at least two polymerizable monomers) of an alkenyl aromatic compound and at least one copolymerizable ethylenically unsaturated comonomer. The alkenyl aromatic polymer material may further include minor proportions of a polymer other than an alkenyl aromatic polymer. The alkenyl aromatic polymer material may be comprised solely of one or more alkenyl aromatic homopolymers, one or more alkenyl aromatic copolymers, terpolymers or interpolymers, a blend of one or more of each of an alkenyl aromatic homopolymer and an alkenyl aromatic copolymer, terpolymer or interpolymer, or blends of any of the foregoing with a polymer other than an alkenyl aromatic polymer. Regardless of composition, the alkenyl aromatic polymer material preferably comprises greater than (>) 50 wt % alkenyl aromatic monomeric units, more preferably >70 wt % alkenyl aromatic monomeric units, based on total aromatic polymer material weight. Most preferably, the alkenyl aromatic polymer material comprises only alkenyl aromatic monomeric units.

Suitable alkenyl aromatic polymers include those derived from alkenyl aromatic monomers such as styrene, alphamethylstyrene, ethylstyrene, vinyl benzene, vinyl toluene, chlorostyrene, and bromostyrene. Polystyrene is a preferred alkenyl aromatic polymer. The alkenyl aromatic polymers may have polymerized therein a minor amount of at least one monoethylenically unsaturated compound such as an alkyl acid or ester that contains from 2 to 6 carbon atoms ($C_{2-6}$), an ionomeric derivative, and a $C_{4-6}$ diene. Illustrative copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. When the alkenyl aromatic monomer is styrene, the alkenyl aromatic polymer material preferably comprises >95 wt % polystyrene, more preferably up to and including 100 wt % polystyrene, based on aromatic polymer material weight.

The preferred polymer foam is an alkenyl aromatic polymer foam comprising >50 wt %, and more preferably, >70 wt % alkenyl aromatic monomeric units. A preferred alkenyl aromatic polymer for use in the present invention is polystyrene. The foam preferably comprises substantially (i.e., >95 wt %), and more preferably, entirely polystyrene, but may also be comprised of other suitable polymeric materials including polyolefins such as polyethylene, and polypropylene and copolymers thereof. U.S. Pat. Nos. 5,461,098; 5,397,807; and 5,571,847, the relevant teachings of which are incorporated herein by reference, disclose useful copolymers of alkenyl aromatic polymers and polyolefin polymers.

Preferred polymer foams are predominantly closed-cell foams in that they have a closed cell content, determined in accordance with American Society for Testing and Materials (ASTM D2856-A), >70%. Such foams have a density that is preferably from 10 to 200 kilograms per cubic meter (kg/$m^3$), and more preferably from 10 to 70 kg/$m^3$ (ASTM D-1622-88). The foam has an average cell size of less than or equal to ($\leqq$) 5 millimeters (mm), preferably from 0.10 to 5.0 mm (ASTM D3576-77).

The foam may also be formed from thermoset polymers such as polyurethane and polyisocyanurate. Polyurethane and polyisocyanurate foams are typically made by reactive foaming of two preformulated components, commonly called the A-component (isocyanate) and the B-component (polyol). The furnace black and the blowing agent may be dispersed in either the isocyanate, the polyol, or both. Useful polyurethanes and polyisocyanurates and processes for making them are disclosed in U.S. Pat. No. 4,795,763, the relevant teachings of which are incorporated herein by reference.

The foam of the present invention may be made by a conventional extrusion foaming process. The foam is generally prepared by heating the polymer material to form a plasticized or melt polymer material, incorporating a blowing agent to form a foamable gel, and extruding the gel through a die to form the foam product. Prior to mixing with the blowing agent, the polymer material is heated to a temperature above its glass transition temperature or peak crystalline melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. The furnace black may be dry blended with the polymer material or mixed with the polymer melt or polymer gel to form a melt material mixture. The furnace black is preferably added as a concentrate in the polymer.

The foamable gel is cooled to an optimum foaming temperature that is close to (i.e., below or above) the glass transition temperature or peak crystalline melting point of the polymer (depending on whether it is amorphous or semicrystalline). Preferred foaming temperatures will vary from 100° C. to 150° C. for PE and polystyrene (PS) foams. It should be appreciated that optimum foaming temperatures will vary depending upon factors including the polymer material characteristics, blowing agent composition and concentration, and the configuration of the extrusion system.

A variety of patent publications relate to foamed objects that comprise a plurality of coalesced, distinguishable, expanded (foamed) polymer strands (strand foams). Illustrative publications include U.S. Pat. No. 3,573,152 (focusing upon column 2, lines 19–35, column 2, line 67 through column 3, line 30, column 4, line 25 through column 5, line 19 and column 5, line 64 through column 6, line 46); U.S. Pat. No. 4,801,484 (with emphasis upon column 1, lines 12–21, column 2, line 55 through column 5, line 8, column 5, lines 16–50 and column 5, line 60 through column 6, line 6); U.S. Pat. No. 4,824,720 (especially column 2, lines 57–68, column 3, line 57 through column 5, line 32 and column 5, lines 50–58); U.S. Pat. No. 5,124,097 (particularly column 3, line 34 through column 4, line 3, column 5, line 31 through column 6, line 11 and column 6, lines 36–54); U.S. Pat. Nos. 5,110,841; 5,109,029 and; European Patent Application (EP-A) 0 279,668; Japanese Patent Application numbers (JP) 60-015114-A; 53-1262 and H6-263909. The relevant portions of such publications, especially those specifically noted, are incorporated herein by reference.

If accelerated blowing agent release is desirable or necessary, the process disclosed in U.S. Pat. Nos. 5,424,016 and 5,585,058, the relevant teachings of which are incorporated herein by reference, provides very satisfactory results. In particular, see column 3, lines 16–41, column 4, lines 31–42, and the Example that spans column 4, line 65 through column 7, line 29. In essence, the process comprises defining a plurality of channels in a foam body. The number of channels suffices to provide accelerated blowing agent release relative to an identical foam save for the absence of such channels.

The foamable gel is typically cooled to a lower temperature to optimize the physical characteristics of the foam structure. The gel is then extruded or conveyed through a die of desired shape to a zone of reduce or lower pressure to form the foam structure. The zone of lower pressure is at a pressure lower than that in which the foamable gel is maintained prior to extrusion through the die.

Suitable blowing agents for use in the present invention include inorganic blowing agents, organic blowing agents, and chemical blowing agents. Inorganic blowing agents which may be used include carbon dioxide, nitrogen, argon, and water, air, nitrogen, and helium. Organic blowing agents include aliphatic hydrocarbons having 1–9 carbon atoms ($C_{1-9}$), $C_{1-3}$ aliphatic alcohols, and fully and partially halogenated aliphatic $C_{1-4}$ hydrocarbons. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC143a), 1,1,1,2-tetrafluoroethane (HFC-134a), pentafluoroethane, difluoromethane, perfluoroethane, 2,2-dichloropropane, difluoropropane, perfluorobutane, perfluorocyclobutane. Partially halogenated chlorocarbons and chlorofluorocarbons for use in the invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1,-dichloro-2,2,2-tetrafluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Suitable chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine. The blowing agents may be used either alone or in combination with other blowing agents or mixtures thereof.

The amount of blowing agent(s) incorporated into the polymer melt material to make a foam-forming polymer gel is from 0.2 to 5.0, preferably from 0.5 to 3.0, and most preferably, from 1.0 to 2.5 gram moles per kilogram of polymer (g-m/kg).

The foam of the present invention may further comprise additives, such as fillers, pigments, colorants, antioxidants, acid scavengers, ultraviolet stabilizers, flame retardants, processing aids, extrusion aids, and the like.

While the preferred process for making the foam is an extrusion process, the foam may also be formed by expansion of pre-expanded beads containing a blowing agent. The beads may be molded at the time of expansion to form articles of various shapes. Processes for making expanded beads and molded expanded beam foam articles are taught in *Plastic Foams, Part II*, Frisch and Saunders, pp. 544–585, Marcel Dekker, Inc. (1973) and *Plastic Materials*, Brydson, $5^{th}$ ed., pp. 426–429, Butterworths (1989), both of which are incorporated herein by reference.

The furnace black may be incorporated into bead foam in several ways. The furnace black may be incorporated during polymerization of expandable beads or it may be incorporated into a melt of the polymer during preparation of the expandable beads.

The foam of the present invention may be closed cell or open cell depending upon the application. For most insulating applications, the present foam is preferably greater than 70% closed-cell according to American Society for Testing and Materials (ASTM) D2856-A.

The resulting foam may be formed into panels used to insulate surfaces or enclosures such as houses, roofing, buildings, refrigerators, freezers, appliances, piping, and vehicles. The foam may also be formed into a plurality of discrete foamed particles for conventional loose-fill cushioning and packaging applications, or may be ground into scrap for use as blown insulation.

The following examples illustrate, but do not limit the scope of the invention.

EXAMPLE 1

Prepare closed-cell foams in accordance with the present invention by expanding polystyrene with 6 parts-per-hundred resin (phr) HFC-134a, 3 phr ethyl chloride and 1.9 phr carbon dioxide ($CO_2$). The polystyrene has a nominal weight average molecular weight ($M_w$) of 192,000. Other ingredients are 0.2 phr tetrasodiumpyrophosphate, 0.05 phr barium stearate, 0.5 phr linear low density polyethylene (LLDPE) and 1 phr hexabromocyclododecane (HBCD). Make the foams with PANTHER 18 furnace black (CB-1). Make comparative foams with Thermax™ MFT thermal black (a product of Cancarb, Canada), hereinafter "CB-2". Feed the carbon blacks as 30 wt % concentrates in the above mentioned polystyrene. All three foams have a vertical cell size of 0.10 mm, based on an average of 3 measurements, and a heat distortion temperature or HDT pass value of 185° F. (85° C.). The CB-2 foam is not part of the present invention. The Normalized Compressive Strength is a ratio of compressive strength in terms of pounds per square inch to the square of foam density in pounds per square foot (NCS-1) or a ratio of compressive strength in terms of kPa to the square of foam density in kg per cubic meter (NCS-2). Express thermal conductivity in terms of British Thermal Units-inch per hour-square foot-°Fahrenheit or milliwatts per meter-°centigrade.

TABLE 1

|  | CB-2 | CB-1 | CB-1 |
| --- | --- | --- | --- |
| Loading of carbon black (phr) | 5 | 2.7 | 5.4 |
| Foaming Temperature (° C.) | 123 | 122 | 124 |
| System pressure drop (psi/bar) | 886/61 | 860/59 | 790/54 |
| Density (without skin), (pcf/kg/m³) | 2.52/40.4 | 2.38/38.2 | 2.34/37.5 |
| Foam Thickness (inch/mm) | 0.75/19.1 | 0.85/21.6 | 0.74/18.8 |
| Open Cells (volume %) | 2.0 | 1.4 | 2.1 |
| NCS-1 | 27.3 | 30.4 | 31.0 |
| NCS-2 | 0.77 | 0.81 | 0.83 |
| Limiting oxygen index (% oxygen) | 23.8 | 23.8 | 21.9 |
| 7 day k-factor (BTU-in/hr-ft²-° F.)/mW/m-° C. | 0.1790/25.8 | 0.1766/25.5 | 0.1797/25.9 |

The foams made with CB-1 exhibit desirably low pressure drops and good end-product foam physical properties (including a lower density and increased normalized compressive strength than that obtained with CB-2).

EXAMPLE 2

Replicate Example 1 using the same polystyrene, a blowing agent combination of 6.5 phr HFC-134a, 2.4 phr ethyl chloride, 1.8 phr normal butane and 0.8 phr carbon dioxide, a foaming temperature of 127° C. and the same types and amounts of "other" ingredients save for adding 0.9 phr pentaerythritol monooleate. Vertical cell size measurements are an average of 4–5 measurements. As with Example 1, foams of the invention include CB-1. Make comparative foams with Thermax™ LPTB thermal black (a product of Cancarb, Canada), hereinafter "CB-3". Feed the carbon blacks as 30 wt % concentrates in the above mentioned polystyrene. The CB-3 foam is not part of the present invention.

TABLE 2

|  | CB-3 | CB-1 | CB-1 |
| --- | --- | --- | --- |
| Loading of carbon black (phr) | 2.5 | 2.5 | 5 |
| System Pressure drop (psi/bar) | 623/43 | 620/43 | 628/43 |
| Density(without skin), pcf | 1.96/31.4 | 1.94/31.1 | 1.99/31.9 |
| Foam Thickness (inch/mm) | 0.97/24.6 | 1.00/25.4 | 0.99/25.2 |
| Open Cells (volume %) | 0.8 | 0.6 | 0.4 |
| Vertical cell size (mm) | 0.29 | 0.32 | 0.35 |
| NCS-1 | 28.9 | 29.9 | 29.0 |
| NCS-2 | 0.78 | 0.80 | 0.78 |
| HDT pass value (° F./° C.) | 165/74 | 175/79 | 165/74 |
| Limiting oxygen index (% oxygen) | 26.3 | 22.5 | 21.3 |
| 7 days k-factor (BTU in/hr ft² ° F.)/(mW/m° C.) | 0.1736/25.0 | 0.1705/24.6 | 0.1705/24.6 |

The data in Table 2 show that the foams made with CB-1 exhibit desirably low pressure drops and good end-product foam physical properties. The foams made with CB-1 also exhibit slightly better insulative properties than the comparative foam made with CB-3.

While certain representative embodiments and details have been shown for purposes of illustrating the invention, those skilled in the art understand that various changes in the methods and apparatus disclosed herein may be made without departing from the scope of the invention, which is defined in the appended claims.

What is claimed is:

1. A polymer foam prepared from a foamable polymeric material that contains a quantity of furnace black sufficient to reduce foam thermal conductivity below that of a corresponding foam prepared from the same foamable polymeric material save for omission of the furnace black, said furnace black having from 3–10% by weight oil incorporated therein, based on total furnace black weight.

2. The polymeric foam of claim 1 in which said foam includes from 1 to 25% by weight of said furnace black.

3. The polymeric foam of claim 1 in which said foam includes from 2 to 10% by weight of said furnace black.

4. The polymeric foam of claim 1 in which said oil comprises hydrotreated heavy naphthenic distillate.

5. The polymeric foam of claim 1 in which said polymeric material comprises an alkenyl aromatic polymer having greater than 50% by weight alkenyl aromatic monomeric units.

6. The polymeric foam of claim 5 in which said polymeric material is polystyrene.

7. The polymeric foam of claim 1 in which said polymeric material is selected from polyethylene, polypropylene, polyisocyanurate, or polyurethane.

8. The polymeric foam of claim 1 having an average cell size of from about 0.10 to 5.0 mm.

9. The polymeric foam of claim 1 in which said foam has greater than 70% closed cells.

10. A process for making a thermoset polymer foam, comprising:
   a) providing a first thermoset monomer;
   b) providing a second thermoset monomer the same or different than the first monomer and polymerizable with the first monomer;

c) incorporating into either or both the first and second monomers an amount of furnace black sufficient to reduce the thermal conductivity of the foam below that of a foam without said furnace black, said furnace black having from 3–10% by weight oil, based on furnace black weight, incorporated therein;

d) incorporating a blowing agent into either or both the first and second monomers; and e) mixing the first and second monomers under polymerizing conditions to form the thermoset polymer foam.

* * * * *